Figure 1:
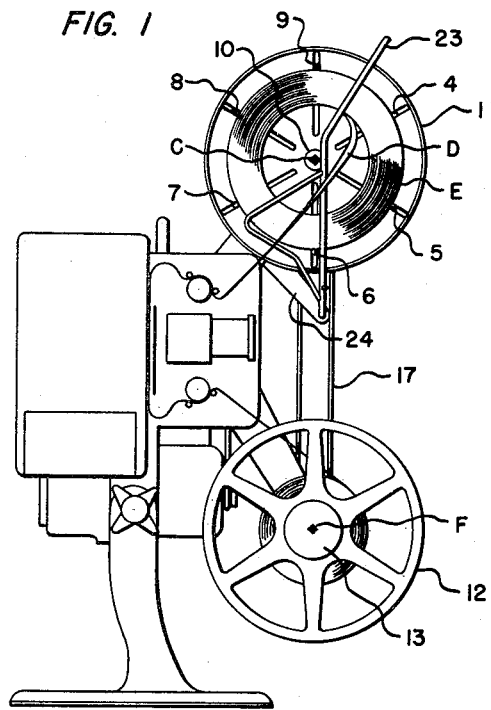

Dec. 1, 1953     R. S. YEATS     2,661,210
FILM REEL FOR MOTION-PICTURE PROJECTORS
Filed July 31, 1950     2 Sheets-Sheet 1

INVENTOR.
ROBERT S. YEATS
BY
Wm. H. Dean
AGENT

Dec. 1, 1953
R. S. YEATS
2,661,210
FILM REEL FOR MOTION-PICTURE PROJECTORS
Filed July 31, 1950
2 Sheets-Sheet 2
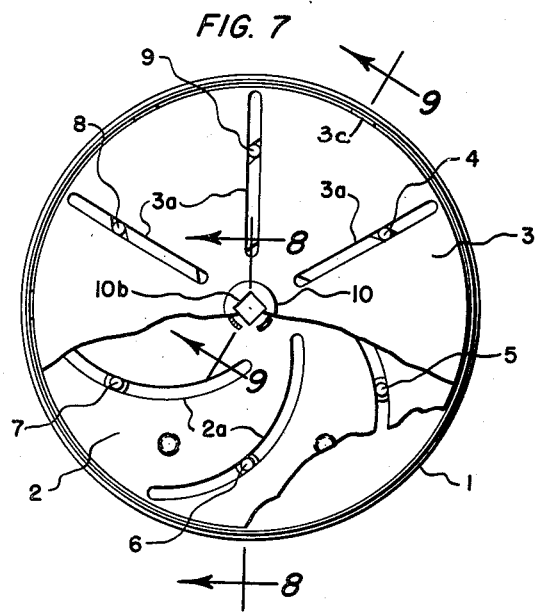
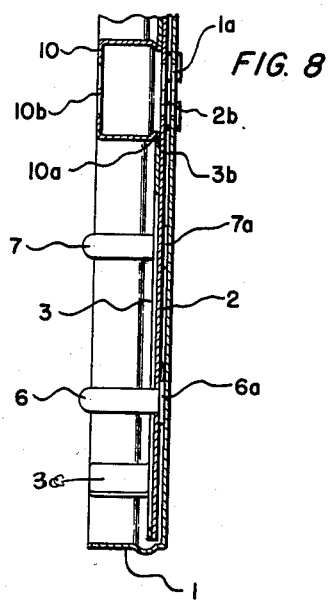
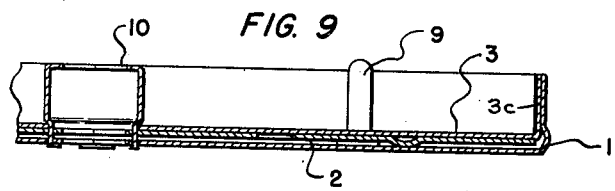
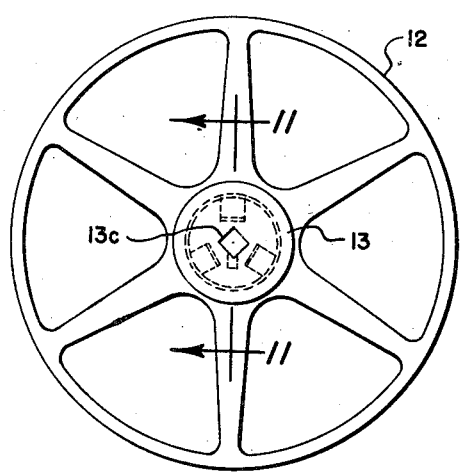
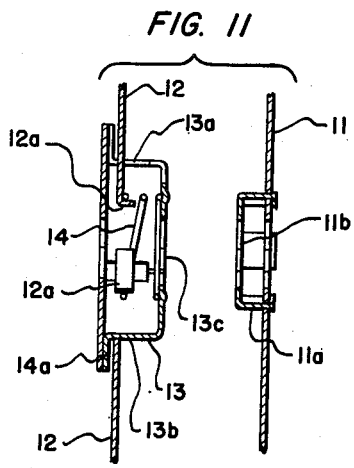
INVENTOR.
ROBERT S. YEATS
BY
*Wm. H. Dean*
AGENT Patented Dec. 1, 1953

2,661,210

UNITED STATES PATENT OFFICE 2,661,210

FILM REEL FOR MOTION-PICTURE PROJECTORS

Robert S. Yeats, San Diego, Calif.

Application July 31, 1950, Serial No. 176,886

4 Claims. (Cl. 271—2.17)

My invention relates to film reels for motion picture projectors, more particularly for use in facilitating the handling of film and eliminating the necessity for rewinding the rolls of film, and the objects of my invention are:

First, to provide a reel of this class having novel adjustable fingers, which support a roll of film at its periphery during the unwinding of the roll from the center thereof;

Second, to provide a reel of this class which is very readily and easily adjusted to accommodate rolls of film of varying diameter;

Third, to provide a reel of this class which may be positioned in the conventional film reel can;

Fourth, to provide a reel having novel film roll ejector means thereon, for use in transferring film from the hub of one reel to a position intermediate the fingers of another reel, so that it may be supported externally during the unwinding of the film from the middle thereof;

Fifth, to provide a film reel arrangement for motion picture projectors, wherein both reels are provided with means for synchronizing the rotative operation thereof, wherein a clutch is readily engageable or disengageable, providing optional use of conventional film reels or my improved film reels, which eliminate the rewinding of film;

Sixth, to provide an improved film holding reel in which a plurality of pins project through a pair of plates, one provided with radial slots and the other provided with spiral slots, whereby movement of one of said plates relative to the other causes radial adjustment of said pins for accommodating a roll of film which may vary in diameter a considerable amount;

Seventh, to provide reels for motion picture projectors which operate in place of conventional film reels, permitting the operator of the projector to very readily and easily use either the conventional reels, or my improved reels, at his option; and Eighth, to provide film reels for motion picture projectors which are very simple and economical of construction, efficient in operation, and which will not readily deteriorate or get out of order.

Figure 2:
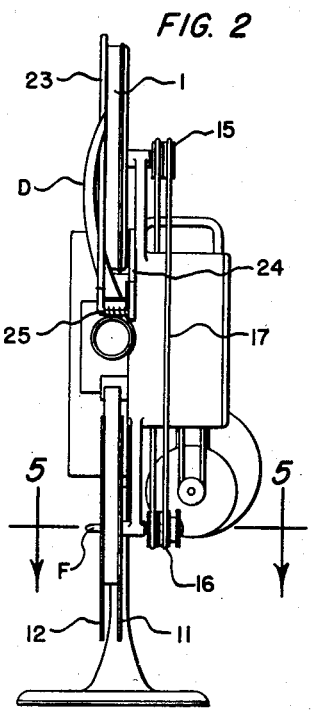
Figure 4:
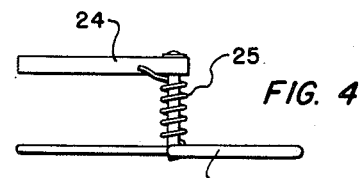
Figure 5:
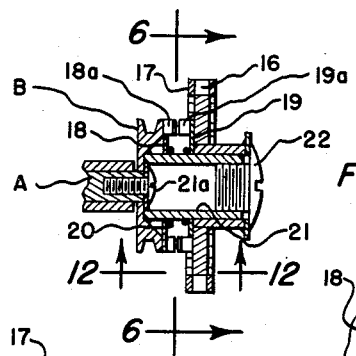
Figures 3, 6:
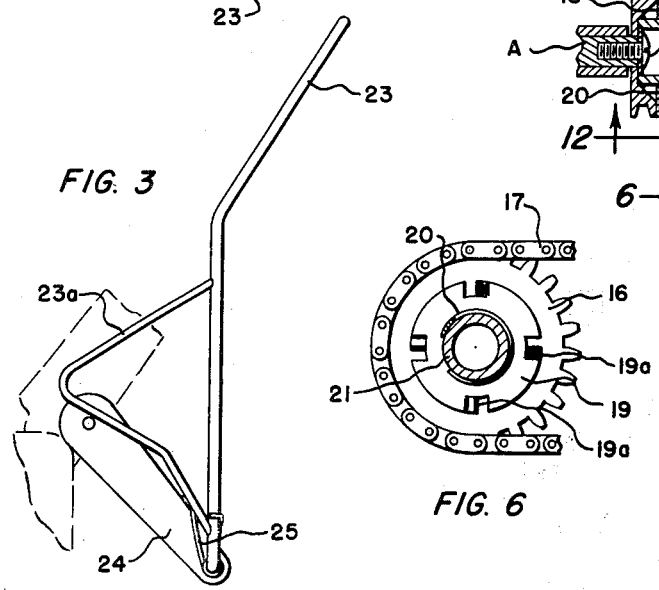
Figure 12:
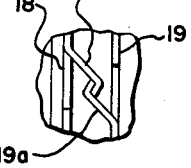

With these and other objects in view, as will appear hereinafter, my invention consists of certain novel features of construction, combination and arrangement, as will be hereinafter described in detail and particularly set forth in the appended claims, reference being had to the accompanying drawings and to the characters of reference thereon, forming a part of this application, in which:

Fig. 1 is a side elevational view of a conventional motion picture projector, showing my film reels in connection therewith; Fig. 2 is a front elevational view of the structure shown in Fig. 1 of the drawings; Fig. 3 is a side elevational view of the film guide used in cooperative relation with my film reels; Fig. 4 is a top or plan view of the structure shown in Fig. 3 of the drawings; Fig. 5 is an enlarged fragmentary sectional view, taken from the line 5—5 of Fig. 2, showing the clutch means; Fig. 6 is a fragmentary sectional view, taken from the line 6—6 of Fig. 5; Fig. 7 is an inside view of one of my film reels, showing portions broken away to amplify the illustration; Fig. 8 is an enlarged fragmentary sectional view, taken from the line 8—8 of Fig. 7; Fig. 9 is an enlarged fragmentary sectional view, taken from the line 9—9 of Fig. 7; Fig. 10 is a side elevational view of a different reel from that shown in Fig. 7; Fig. 11 is an enlarged fragmentary sectional view, taken from the line 11—11 of Fig. 10; and Fig. 12 is a sectional view, taken from the line 12—12 of Fig. 5.

Similar characters of reference refer to similar parts and portions throughout the several views of the drawings.

The reel can 1, plates 2 and 3, pins 4, 5, 6, 7, 8 and 9, hub 10, reel plates 11 and 12, retractable hub 13, spring 14, sprockets 15 and 16, chain 17, clutch members 18 and 19, spring 20, bearing member 21, screw 22, film guide 23, arm 24, and the spring 25, constitute the principal parts and portions of my film reels for motion picture projectors.

The reel can 1 is a substantially conventional film reel can, and fixed therein is the plate 2 of substantially the same diameter as the inside of the reel can 1. The plate 2 is provided with spiral slots 2a, through which the pins 4, 5, 6, 7, 8 and 9 project. It will be noted that these pins, as shown in Fig. 8, are provided with heads 6a and 7a, substantially greater in diameter than the width of the slots 2a, for retaining the same therein. The plate 3 is provided with straight radial slots 3a, through which said pins 4, 5, 6, 7, 8 and 9 project, and this plate 3 is mounted in the reel can 1 and capable of limited rotation relative thereto for the purpose of moving the pins 4, 5, 6, 7, 8 and 9 in the spiral slots 2a, radially inwardly and outwardly as desired. The plate 3 has lugs 3c integral therewith which are bent over at right angles with the plate 3 and fitting closely against the inside of the peripheral wall of the reel can. These lugs 3c provide handle means to facilitate rotation of the plate 3 relative to the plate 2. The plate 3 is provided with a central opening 3b surrounding the hub 10, as shown in Fig. 8 of the drawings, which is fixed to the enclosed side of the reel can 1. This hub 10 is provided with a shoulder portion 10a, which retains the plate 3, preventing the same from being displaced longitudinally of the axis of the hub 10 from the reel can 1.

The reel plates 11 and 12, shown in Figs. 10 and 11 of the drawings, constitute the other reel of my reels for motion picture projectors. The plate 12 is provided with cut-out portions forming an open spoke structure, substantially conventional in appearance, and movably mounted in the central portion of this plate 12 is the retractable hub 13, acted upon by the spring 14, which tends to hold the same inwardly in the solid line position, as shown in Fig. 11 of the drawings. The hub 13 is provided with slots 13a in the annular wall thereof, through which the fingers 12a of the plate 12 extend. A spring 14 is mounted coaxially of and completely within the hub 13 and this spring is compressed between an end of the hub and the inner ends of the fingers 12, the spring thus tending to hold the flange 14a adjacent to the side of the plate 12. Thus, the hub portion 13b is supported as an axial spool upon which film may be wound.

The plate 11 is provided with a fixed hub 11a, having an opening 11b therein, adapted to fit the square hub of the conventional motion picture reel spindles. Likewise, the hub 13 on the plate 12 is provided with a similar opening 13c.

The hub 10, hereinbefore described and shown in Figs. 7 and 8 of the drawings, is provided with an opening 10b, engageable with the rectangular in cross-section spindle of a conventional motion picture projector. The hole 10b aligns with holes 1a and 2b in the closed side of the reel can 1 and in the middle of the plate 2.

Secured on the conventional rotating spindles of the motion picture projector are the sprockets 15 and 16. These sprockets 15 and 16 are engaged by the chain 17 and cooperate therewith for synchronously rotating the reel can 1 and the plates 11 and 12, which form the lower film-receiving or take-up reel on the projector, as shown in Figs. 1 and 2 of the drawings. On the spindle shaft A, which is the lower reel-supporting spindle shaft of the motion picture projector, as shown in Fig. 5 of the drawings, is the conventional rewind pulley B, and the bearing member 21, which is secured by means of a screw 21a to said shaft A. This bearing 21 is a hollow cylindrical bearing, on the outer side of which is fixed the clutch member 18.

This clutch member 18 is provided with a plurality of extending fingers 18a, engageable with similar fingers 19a of the clutch member 19, which is fixed to the sprocket 16, freely rotatably mounted on the outer side of the bearing 21 and normally held in abutted relationship with the head of the screw 22, by means of the spring 20, wherein the clutch members 18 and 19 are disengaged. It will be noted that the clutch members 18 and 19, as shown in Fig. 12, are in the engaged position, wherein they are interlocked, due to the hook-shaped structure of the finger portions 18a and 19a of said clutch members 18 and 19.

The film guide 23 is pivotally mounted at its lower end on the arm 24, which is secured in stationary position on the conventional projector, shown in Fig. 1 of the drawings. The spring 25 tends to retract the film guide 23 toward the upper end of the arm 24, and the film guide 23, when in operating position, normally engages the circular in cross-section stub end C of the upper spindle shaft of the projector, as shown in Fig. 1 of the drawings, which maintains the same in proper position for guiding the film D as it enters the projector from the interior of the roll of film E in the reel can 1, all as shown best in Fig. 1 of the drawings.

The film guide 23 is provided with an extending angular portion 23a, which guides the film intermediate the reel can 1 and the entrance of the film into the projector.

The operation of my film reels for motion picture projectors is substantially as follows:

When the hub 10 of the reel can 1 is supported on the spindle C of the motion picture projector as shown in Fig. 1 of the drawings, the roll of film E is engaged at its periphery by the pins 4, 5, 6, 7, 8 and 9, and the film D is extended from the interior of the roll E through the projector and onto the hub 13 of the reel formed by the plates 11 and 12 on the lower spindle F of the projector, as shown in Fig. 1 of the drawings. The sprockets 15 and 16, together with the synchronizing chain 17, and the clutches 18 and 19, in engaged relation with each other, provide a synchronizing means which drives the upper reel at the same rotating speed as the lower reel, whereby the film is wound on the lower reel at the same diameter as it is being unwound from the upper reel.

When the reel is entirely wound on the hub 13 between the plates 11 and 12, the film guide 23 may be moved out of position by shifting it past the end of the spindle C of the projector, and the film on the hub 13 may be transferred to a position intermediate the pins 4, 5, 6, 7, 8 and 9 by engaging the center of the hub 13 with the hub 10 and forcing the plate 12 inwardly, which slips the roll of film off the hub 13 and into the reel can 1, adjacent the plate 3, intermediate the pins 4, 5, 6, 7, 8 and 9. As the film passes from its roll in the reel can through the projector, it slides around the film guide 23, which causes an angular transition therein, and which provides for considerable flexibility in the unwinding of the film from the roll E. Thus, film breakage is reduced to a minimum.

It will be noted that the conventional slippage belts of the conventional motion picture projector are employed, which operate the spindle F, causing the same to synchronously drive the spindle C during the entire transfer of the roll of film E to the hub 13b, intermediate the plates 11 and 12. It will be noted that when the plates 11 and 12 are on the spindle F, as shown in Fig. 1, the hubs 13 and 11a abut each other.

In order to provide initial adjustment of the pins 4, 5, 6, 7, 8, and 9 in certain spaced relationship to each other, the plate 3 may be rotated within the reel can 1 to retract or extend these pins radially in the slots 3a, as desired.

In order to engage the clutch members 18 and 19 for synchronous operation of the upper and lower reels of the projector, as shown in Fig. 1 of the drawings, the clutch member 19, together with the sprocket 16, may be pressed inwardly against compression of the spring 20, causing the fingers 18a and 19a to interlock and engage.

While the clutch members 18 and 19 are engaged, the motion picture projector may be operated as shown in Fig. 1 of the drawings, employing my improved reels. If it is desired to use the motion picture projector with conventional film reels, the clutch members 18a and 19a may be disengaged, and the motion picture projector may be operated in the conventional way, and may be used to rewind film as desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A motion picture projection supply reel can having an open side and a substantially flat side, means for peripherally engaging a roll of film comprising a pair of plates within said can and parallel to said flat side, the first of said plates having radial slots therein, the second of said plates having spiral slots of similar width, one of said plates being secured to said flat side, the other plate being rotatably mounted on said flat side, pins in said slots projecting therethrough and engageable with the periphery of a roll of film, said pins having heads larger than the transverse dimension of said slots and said heads being slidably held between said flat side and the plate proximate to said flat side.

2. A motion picture projection supply reel can having an open side and a substantially flat side, means for peripherally engaging a roll of film comprising a pair of plates within said can and parallel to said flat side, the first of said plates having radial slots therein, the second of said plates having spiral slots of similar width, one of said plates being secured to said flat side, the other plate being rotatably mounted on said flat side, pins in said slots projecting therethrough and engageable with the periphery of a roll of film, said pins having heads larger than the transverse dimension of said slots, said head being slidably held between said flat side and the plate proximate to said flat side, a fixed hub in said reel, a single-sided take-up reel having a spring loaded axially retractable hub whereby a roll of film may be transferred to said supply reel can by axially applying said single-sided reel onto said supply reel can so that said fixed hub forcefully displaces said retractable hub simultaneously with the projection of the roll of film into said supply reel can intermediate said pins and thus making the film available for projection without rewinding the film.

3. Apparatus according to claim 2, wherein said plate proximate to said flat side is rigidly secured to said flat side, said fixed hub having a shoulder therein, and the plate remote from said flat side is rotatively mounted on said fixed hub and retained thereon by said shoulder.

4. Apparatus according to claim 2 and including a combination film guide and supply film roll retainer extending in one position thereof across a major portion of the open side of said supply reel can so as to contact only edge portions of a film and thus preventing serious wear or damage to the film.

ROBERT S. YEATS.

References Cited in the file of this patent

UNITED STATES PATENTS

| Number | Name | Date |
|---|---|---|
| 980,378 | Wiggins | Jan. 3, 1911 |
| 994,044 | Uebelmesser | May 30, 1911 |
| 1,186,924 | McNeel | June 13, 1916 |
| 1,242,006 | Longenecker | Oct. 2, 1917 |
| 1,276,054 | Grabe | Aug. 20, 1918 |
| 1,823,245 | Wittel | Sept. 15, 1931 |
| 2,177,505 | Schalie | Oct. 24, 1939 |
| 2,443,248 | Hurley | June 15, 1948 |